United States Patent
Scoca et al.

(10) Patent No.: US 7,738,316 B2
(45) Date of Patent: Jun. 15, 2010

(54) METHOD AND APPARATUS FOR HYDROPHONE ARRAY FAULT DETECTION AND EXCLUSION

(75) Inventors: Anthony L. Scoca, Hicksville, NY (US); James G. Huber, North Babylon, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 409 days.

(21) Appl. No.: 11/945,144

(22) Filed: Nov. 26, 2007

(65) Prior Publication Data

US 2008/0192579 A1 Aug. 14, 2008

Related U.S. Application Data

(60) Provisional application No. 60/867,720, filed on Nov. 29, 2006.

(51) Int. Cl.
*H04B 17/00* (2006.01)
(52) U.S. Cl. ........................................ 367/13
(58) Field of Classification Search ............ 367/13–190
See application file for complete search history.

(56) References Cited

U.S. PATENT DOCUMENTS 7,525,875 B2 * 4/2009 Scoca et al. ............... 367/89
2006/0110292 A1 * 5/2006 Deverse et al. ............ 422/68.1

* cited by examiner

*Primary Examiner*—Thomas H Tarcza
*Assistant Examiner*—Luke D Ratcliffe
(74) *Attorney, Agent, or Firm*—DeMont & Breyer, LLC

(57) ABSTRACT

A system is disclosed that provides an improvement in detecting a faulty hydrophone channel in a hydrophone array. The disclosed technique operates on pairs of hydrophones or, to generalize, on groups of two or more hydrophones; this is in contrast with operating on only one hydrophone at a time. As a result, the technique is able to use correlation data from the multiple hydrophones, in order to detect a fault. The technique also operates on received echo signal information that is associated with ongoing SONAR solution processing. The use of the relatively deterministic, echo signal information further enhances the performance. By using correlation products made up of the received echo signal information, the disclosed technique is able to leverage the SONAR solution processing that already relies upon the hydrophone array, such as spatial or temporal correlation SONAR, thereby reducing the additional processing incurred. Once a failed hydrophone channel has been identified, it is then excluded from the ongoing SONAR solution processing.

20 Claims, 5 Drawing Sheets

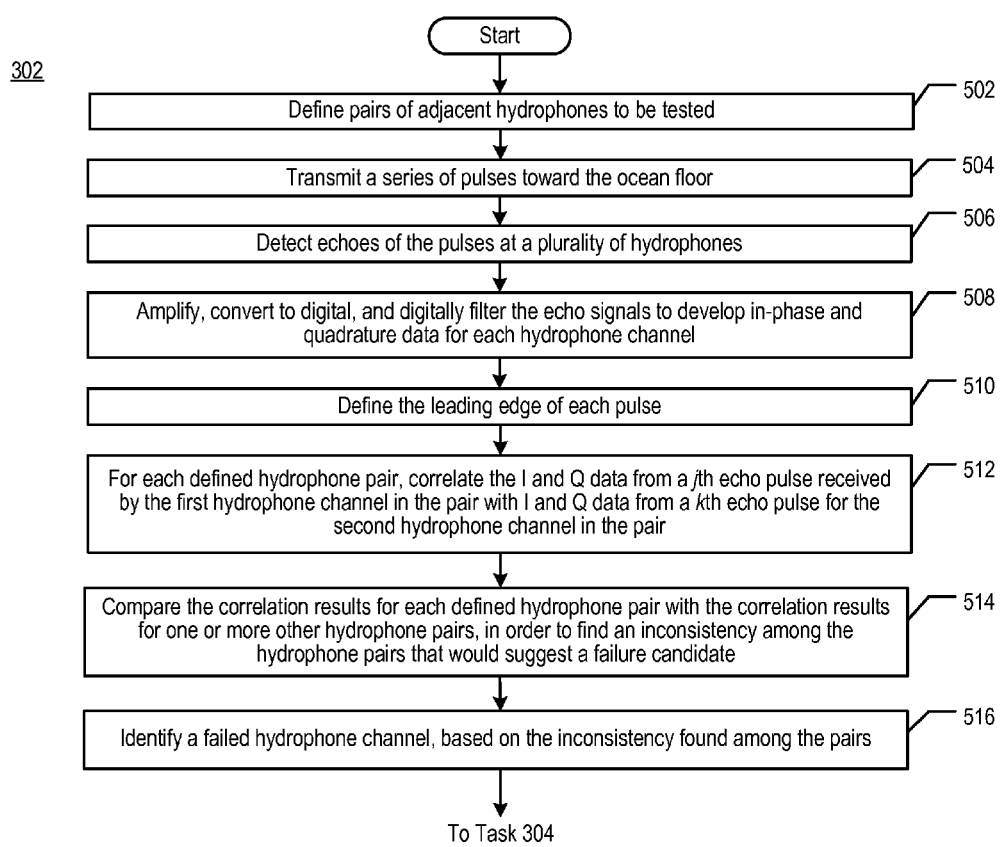

METHOD AND APPARATUS FOR HYDROPHONE ARRAY FAULT DETECTION AND EXCLUSION

CROSS REFERENCE TO RELATED APPLICATIONS

The following is incorporated herein by reference:
(1) U.S. patent application Ser. No. 60/867,720, filed Nov. 29, 2006.

If there are any contradictions or inconsistencies in language between this application and the case that has been incorporated by reference that might affect the interpretation of the claims in this application, the claims in this application should be interpreted to be consistent with the language in this application.

FIELD OF THE INVENTION

The present invention relates generally to SONAR systems, and, more particularly, to fault detection in hydrophone arrays.

BACKGROUND OF THE INVENTION

SONAR (SOund Navigation And Ranging) is the generic name of the technology that is used to locate objects underwater. SONAR is used in marine, geological, and biological research, undersea mapping and navigation, and various commercial and military applications.

An "active" SONAR system is a type of SONAR system in which a "projector" emits a pulse of sound and underwater microphones called "hydrophones" receive underwater sounds to be signal processed. If the transmitted pulses encounter an underwater object (a "target"), a portion of the sound is reflected as an "echo." Knowing the speed of sound in water and the time for the sound wave to travel to the target and back, the distance between the listening-post vessel (e.g., ship, etc.) and the target can be calculated. Active sonar systems generally use highly directional beams of sound when searching for targets, which enable them to determine direction to the target, as well as the distance.

Another application of active SONAR processing is for measuring the velocity of the sound-projecting vessel itself. The SONAR source of the vessel directs sonic pulses towards the ocean floor, and the receivers detect echoes of those pulses. The velocity of the vessel is then calculated based upon the distance traveled by the vessel between the transmission and reception of a first pulse and a second pulse. Examples of velocity-measurement SONARs are spatial correlation SONAR and temporal correlation SONAR, which rely on selecting a maximum "correlation" between hydrophones in the case of spatial correlation or pulses in the case of temporal correlation.

Although hydrophones can be used singly, they are often used in an array. A hydrophone array is made up of a plurality of hydrophones that are placed in known locations. For example, hydrophones can be placed in a line on the seafloor, moored in a vertical line in the water column, or towed in a horizontal line behind a ship or submarine.

A hydrophone array is much better at detecting a single specific sound than a single hydrophone. This is because the array is able to filter out noise coming in from all directions and focus on sounds arriving from a specific direction. The increased signal-to-noise ratio allows sounds that normally could not be detected by a single hydrophone to be heard. Furthermore, if a hydrophone array is being used to receive a specific sound source, the source can be quieter, yet still be detected.

Although specifics can vary depending upon the algorithm used, a hydrophone array determines the direction of the source of a sound in the following manner. Consider a sound arriving at a hydrophone array from a distant source, such as a submarine. The sound will reach each hydrophone in the array at slightly different times based on their different positions in the array and as a function of the direction from which the sound is coming. This time difference is known as the time-of-arrival-difference. Using this information from all the hydrophones in the array, and knowing the specific location of each hydrophone in the array, the direction from which the sound is coming can be determined.

It will be appreciated that if one or more of the hydrophones in a hydrophone array malfunction, the malfunction can degrade the performance of the associated SONAR system. While the performance degradation issue can be addressed, the more vexing issue is detection. That is, how does one detect if a hydrophone is malfunctioning or has failed? This is a critical issue because if undetected, a malfunctioning hydrophone can result in inaccuracies in the solutions obtained from the SONAR system. Even worse, the inaccuracies might not be recognized as such.

In order for SONAR systems to provide reliable information, the hydrophones that provide the SONAR data must be reliable. Determining the reliability of the hydrophones requires that hydrophone channel health tests be performed. A "hydrophone channel" is defined herein as including a hydrophone and all associated cabling, signal routing, and processing of that hydrophone's output.

Various techniques in the prior art exist for testing the hydrophone channels. Those techniques include a "low-noise" test, a "reverberation" test, and a "high-noise" test. The low-noise test is designed to detect a low noise level in a situation where a higher noise level is normally expected. Disadvantageously, this test only works properly in a high-noise environment and is susceptible to variable sea noise effects. The reverberation test is designed to detect an echo from close-in, own-transmission reverberation off the water volume and then to compare the level of the detected echo against a predetermined threshold; the test declares the associated hydrophone channel as having failed if the compared level is insufficient. However, this test is only designed to detect a low signal, not noise intrusion, and it might not detect a failing hydrophone. The high-noise test is designed to detect a high noise level. But as with the low-noise test, this test's shortcoming is that it is also susceptible to variable sea noise effects.

What is needed is an improved technique for performing fault detection on hydrophone channels, without some of the disadvantages in the prior art.

SUMMARY OF THE INVENTION

The present invention provides an improved technique for detecting a faulty hydrophone channel in a hydrophone array. In comparison with some techniques in the prior art, the technique disclosed herein is more robust at fault detection. The first reason for this robustness is that the disclosed technique operates on pairs of hydrophones or, to generalize, on groups of two or more hydrophones; this is in contrast with operating on only one hydrophone at a time, as in some prior art techniques. As a result, the disclosed technique is able to use correlation data (i.e., between the multiple hydrophones) to detect a fault. The second reason is that the disclosed technique operates on echo signal information that results from a series of pulses being projected by a transmitter that is associated with the hydrophone array being tested. The use of the relatively deterministic, echo signal information, as opposed to using noise as in some prior art techniques, further enhances the performance. In accordance with the illustrative embodiment, once a failed hydrophone channel has been identified, it is then excluded from the SONAR solution processing that relies upon the hydrophone array being tested.

The technique of the illustrative embodiment works as follows. Pairs (or groups) of adjacent or nearby hydrophones in the hydrophone array are first defined. Then, echo pulse correlation products are generated for each defined hydrophone pair, based on the return echo signal information that results from the transmitter projecting a series of pulses. The correlation task of the illustrative embodiment is able to leverage the ongoing SONAR solution processing, such as spatial or temporal correlation SONAR used for velocity measurement; advantageously, this minimizes the additional processing that is contributed by the disclosed technique. The correlation product of each pair is then compared against a reference value, in order to find an inconsistency. For example, the reference value can be a weighted mean of some or all of the correlation products generated. As a result of the comparison, a first failure candidate pair is identified when its correlation product falls below a predetermined level that is related to the reference value. The specific faulty hydrophone channel is determined by identifying a second failure candidate pair with a common hydrophone. After the specific channel is determined, it is excluded from the SONAR solution processing, thereby maintaining the reliability of the ongoing processing.

There are a number of benefits to being able to reliably detect a faulty hydrophone channel and to then exclude that hydrophone channel from SONAR processing such as velocity estimation. One benefit is that a velocity estimation with greater availability results in improved estimates of a ship's position (when those estimates are velocity-based) for submerged vehicles (e.g., submarines, AUVs, UUVs, etc.). This is particularly important for submerged vehicles for which Global Positioning System (GPS) fixes are not available or otherwise kept to a minimum to maintain the ship's covertness. Another benefit of having high-availability velocity estimates is that they improve the accuracy of certain on-board missile-delivery systems that employ a technique to obtain a velocity fix, which is then provided as initialization data to the missile before launch. In other words, high-availability estimates reduce the missile Circular Error Probable (CEP).

The illustrative embodiment features a hydrophone-based system with correlation-array processing and for which fault detection can be performed. However, as those who are skilled in the art will appreciate, after reading this specification, alternative embodiments can be made and used in which the fault detection disclosed herein is applied to a system that is based on a non-correlation type of active SONAR processing such as active beamforming SONAR. After reading this specification, those who are skilled in the art will further appreciate that the fault detection can be applied to other types systems such as RADAR (RAdio Detection And Ranging).

A method for fault detection in a hydrophone array, in accordance with the illustrative embodiment of the present invention, comprises: defining groups of hydrophones in the hydrophone array, resulting in a plurality of defined groups; generating, for each group in the plurality, a correlation product that is based on signals received by the hydrophones in the group; searching for an inconsistency in the correlation product of a first group in the plurality, relative to a reference value; and identifying a failed hydrophone channel by searching for an inconsistency in the correlation product of a second defined group in the plurality, the second defined group comprising one of the hydrophones in the first defined group.

A hydrophone array fault-detection system, in accordance with the illustrative embodiment of the present invention, comprises: a hydrophone array that comprises a plurality of hydrophones; means for generating, for each group in a plurality of defined groups of hydrophones in the hydrophone array, a correlation product that is based on signals received by the hydrophones in the group; means for searching for an inconsistency in the correlation product of a first group in the plurality, relative to a reference value; and means for identifying a failed hydrophone channel by searching for an inconsistency in the correlation product of a second defined group in the plurality, the second defined group comprising one of the hydrophones in the first defined group.

BRIEF DESCRIPTION OF THE DRAWINGS

FIG. 5 depicts the salient tasks for detecting one or more hydrophone channel failures, in accordance with the illustrative embodiment of the present invention.

DETAILED DESCRIPTION

Figure 1:
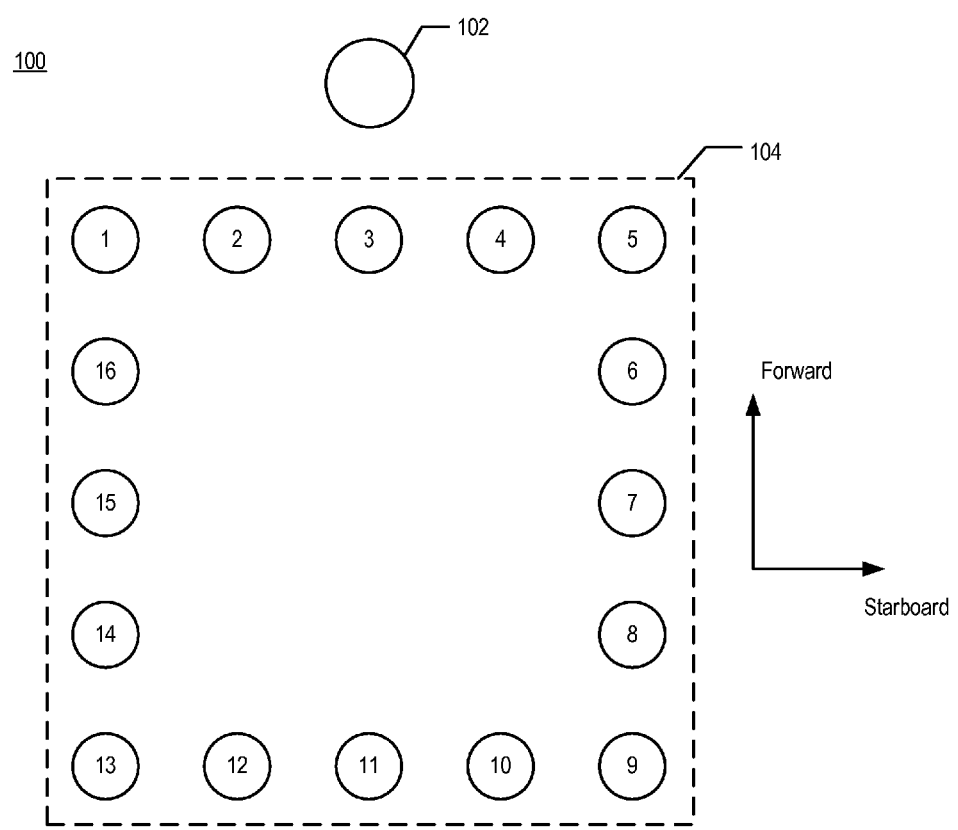
FIG. 1 depicts a schematic diagram of a prior-art, spatial correlation SONAR system for measuring velocity.

FIG. 1 depicts a schematic diagram of a prior-art, spatial correlation SONAR system for measuring velocity. The depicted system is considered here for pedagogical purposes; after reading this specification, those who are skilled in the art will appreciate that the embodiments described herein are applicable to other systems as well. SONAR system 100, which may be mounted on the underside of a ship, comprises transmitter 102 and receiver array 104. Receiver array 104 comprises receivers 1 through 16, wherein each receiver is commonly referred to as a "hydrophone." (The terms "receiver" and "hydrophone" are used interchangeably herein.)

In array 104, receivers 12, 11, and 10 are not normally used. That is, in the prior art, they are used only if there is a failure in other hydrophones in the array. The term "back-up," as used in this Specification and applied to hydrophones, refers to a hydrophone that is normally not used. In contrast, hydrophones 1-9 and 13-16 are, in fact, normally used. The term "prime," as used in this Specification and applied to hydrophones, refers to a hydrophone that is normally used. If a prime hydrophone fails, it can be replaced with a back-up hydrophone.

It will be clear to those skilled in the art, after reading this specification, how to make and use alternative embodiments in which there is a different combination of prime and back-up hydrophones than that depicted in FIG. 1, or only one type of hydrophone present (i.e., all "prime").

Consistent with the drawing of the distinction between prime hydrophones and back-up hydrophones, the hydrophones in array 104 can be assigned different levels of importance, in terms of their ongoing criticality in providing reliable SONAR signals to the processing involved. For example, the back-up hydrophones can be considered as the least important, while the prime hydrophones can be further categorized into one or more different levels of importance above that of the back-up hydrophones.

Figure 2:
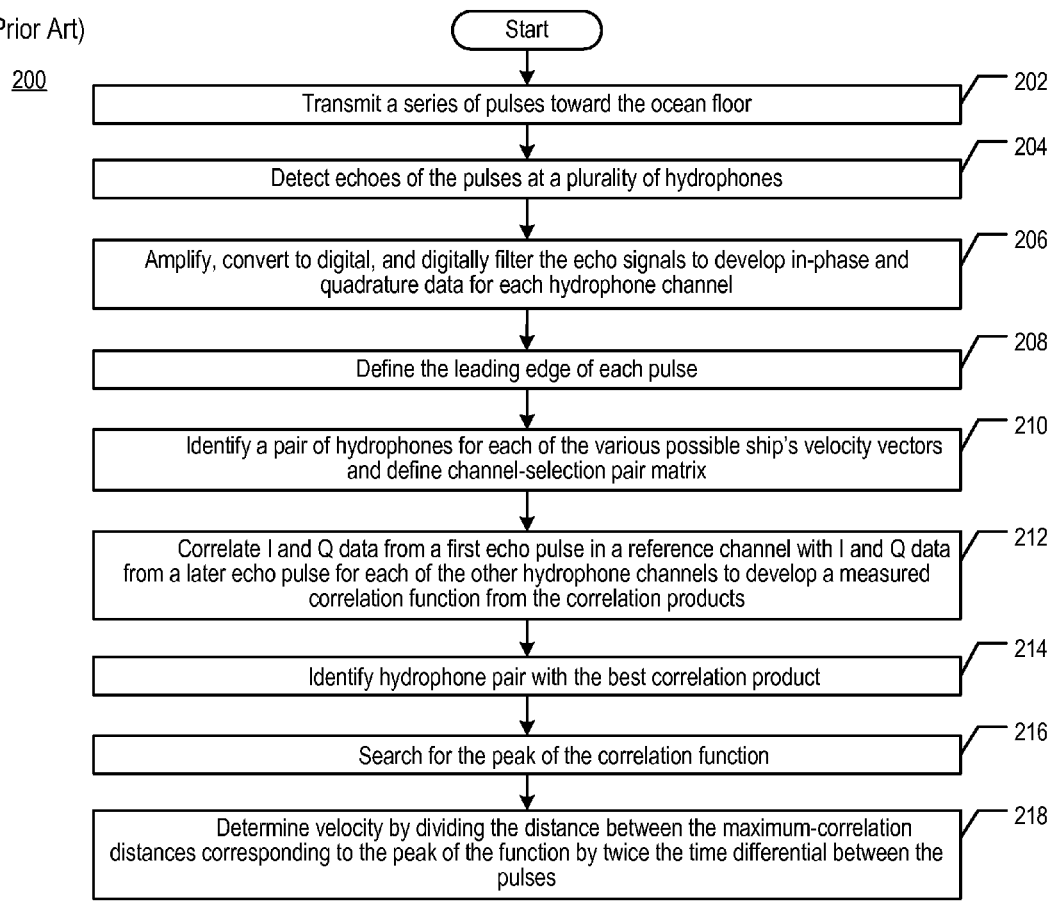
FIG. 2 depicts prior-art method 200 for velocity-measuring, spatial correlation SONAR processing.

The hydrophones in array 104 are used to perform SONAR signal processing. One type of SONAR signal processing is velocity-measuring, correlation SONAR. A prior-art method for performing spatial correlation SONAR processing is discussed with respect to FIG. 2. The processing that takes place as part of method 200 in FIG. 2 is discussed, in order to provide a basis of understanding for some of the concepts in the later-discussed technique of the illustrative embodiment.

At task 202 of method 200, a series of pulses are transmitted towards the ocean bottom.

At task 204, echoes are detected at each prime hydrophone 1-9 and 13-16. For a ground-referenced correlation SONAR, the echoes are returned from the ocean floor. For a water-referenced correlation SONAR, the echoes are returned from the water volume beneath the ship.

At task 206, pulse echo data is amplified, converted from analog to digital, and then digitally filtered to yield in-phase ("I") and quadrature ("Q") data for each hydrophone channel. This I and Q data contains all of the amplitude and phase information contained in the echo pulses, but is base banded and thus vastly reduced in data rate from the A-to-D-converted echo signals.

In accordance with task 208, a pulse location algorithm is employed to define the leading edge of each pulse.

At task 210, a pair of prime hydrophones is identified for each of the ship's various possible velocity vectors, given the arrangement of receiver array 104. Redundant channels—those that have the same velocity (speed and direction) as an identified pair—are not used at this point. For example, if (1, 16) is identified as a hydrophone pair, then the following pairs would be considered redundant: (16, 15); (15, 14); (14, 13); (5, 6); (6, 7); (7, 8); and (8, 9). Furthermore, no pairing is made at this point for any back-up hydrophone, such as hydrophones 10 through 12. A channel-selection pair matrix, which includes all of the possible non-redundant ship's velocity vectors, is created as the result of performing task 210.

At task 212, I and Q data from a first echo pulse in a reference channel is correlated with I and Q data from a later echo pulse for each of the other channels, thereby forming a correlation product for each channel-selection pair (i.e., hydrophone pair). These individual correlation products together describe a measured correlation function.

At task 214, the hydrophone pair having the best correlation product (the "best-correlated" hydrophone pair) is identified.

At task 216, an M-by-M array of hydrophone-pair correlation products is formed (e.g., M equals three, etc.) in the channel-selection pair matrix, wherein the array is centered about the best-correlated hydrophone pair from task 214. A search for the peak of the correlation function is performed, which can possibly lie somewhere between the best-correlated hydrophone pair and another hydrophone pair in the M-by-M array. For example, an interpolation algorithm can be used on the correlation products, in order to find the location of the peak in relation to the hydrophone pairs.

The correlation function that is described by the correlation products and the peak is a relationship between i) the correlation between hydrophone pairs and ii) their displacement in the x and y directions, where "x" and "y" correspond to the fore/aft and athwart-ship directions, respectively. The location of the correlation peak provides "maximum-correlation distance" components in the fore/aft and athwart-ship directions. The velocity is determined at task 218 by dividing the maximum-correlation distance for each directional component by twice the time differential between the pulses.

Method 200 can be repeated, periodically or sporadically, in order to provide updated determinations of velocity.

Figure 3:
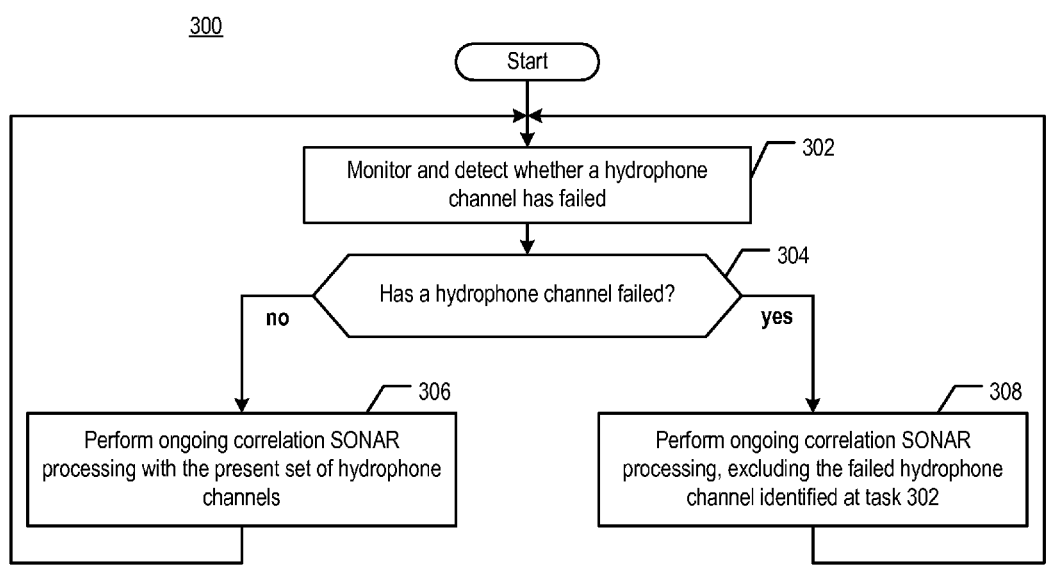
FIG. 3 depicts method 300 for detecting one or more failed hydrophone channels in array 104 and then excluding those hydrophone channels from further processing, in accordance with the illustrative technique of the present invention.

FIG. 3 depicts method 300 for detecting one or more failed hydrophone channels in array 104 and then excluding those hydrophone channels from further processing, in accordance with the illustrative technique of the present invention. As those who are skilled in the art will appreciate, at least some of the tasks depicted in FIG. 3 can be performed simultaneously or in a different order than that depicted. Furthermore, it will be clear to those skilled in the art, after reading this specification, how to make and use alternative embodiments in which the illustrative embodiment technique is invoked under different circumstances than that represented in FIG. 3.

At task 302, in accordance with the illustrative embodiment, hydrophone channels are monitored to detect whether any have failed and, if a failure is detected, to identify the failed hydrophone channel. The detection technique of the illustrative embodiment is described in detail below and with respect to FIG. 4.

At task 304, if a hydrophone channel has been detected at task 302 as having failed, then task execution proceeds to task 308. If a hydrophone channel has not failed, task execution proceeds to task 306.

At task 306, the ongoing SONAR signal processing (such as the velocity-measuring technique of method 200) is performed as before. Task execution then proceeds back to task 302, in order to continue monitoring for hydrophone channel failures and to detect those failures as they occur.

Figure 4:
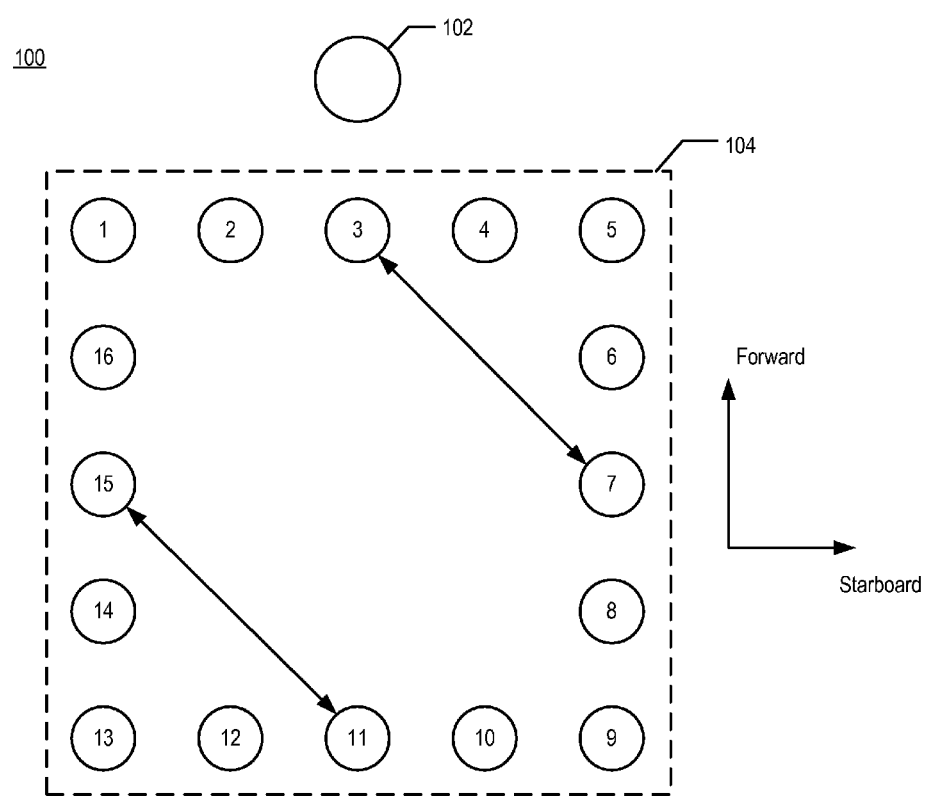
FIG. 4 depicts SONAR system 100, in which the velocity vector represented by hydrophone pair (3,7) can alternatively be represented by hydrophone pair (15,11), in the event that hydrophones 3 and/or 7 are detected as having failed.

At task 308, the ongoing SONAR signal processing (such as the velocity-measuring technique of method 200) is performed with the failed hydrophone channel detected at task 302 being excluded from the processing. For example, when a hydrophone channel fails in a hydrophone pair, another pair of hydrophones can be used to represent (i.e., "cover") the same velocity vector as the first pair, provided that another hydrophone pair is available. For example, FIG. 4 depicts SONAR system 100, in which the velocity vector represented by hydrophone pair (3,7) can alternatively be represented by hydrophone pair (15,11). Although hydrophone 11 is one of the back-up hydrophones, it can be made active when needed, such as when one or both of the hydrophone channels in hydrophone pair (3,7) fails.

Excluding the failed hydrophone channel from SONAR solution processing, as well as subsequently identifying and using another hydrophone pair to compensate for the failure, provides a way to address the failure problem, once the failure has been detected.

Task execution then proceeds back to task 302, in order to continue monitoring for hydrophone channel failures and to detect those failures as they occur.

FIG. 5 depicts the salient tasks that are associated with task 302 for monitoring and detecting one or more hydrophone channel failures, in accordance with the illustrative embodiment of the present invention. As those who are skilled in the art will appreciate, at least some of the tasks depicted in FIG. 5 can be performed simultaneously or in a different order than that depicted.

The fault detection of the illustrative embodiment is applicable to a hydrophone-based processing system. However, as those who are skilled in the art will appreciate, after reading this specification, alternative embodiments can be made and used in which the fault detection that is disclosed herein is adapted to another type of receiver channel in another type of processing system. One such example is RADAR (RAdio Detection And Ranging).

In accordance with the illustrative embodiment, at least some of the tasks that are depicted in FIG. 5 are performed concurrently with velocity-measurement, spatial correlation SONAR processing, such as the processing described with respect to FIG. 2. In fact, in some embodiments, the fault detection tasks that are depicted in FIG. 5 can be adapted to leverage some of the processing performed as part of method 200 or a similar method of SONAR processing. Alternatively in some other embodiments, the fault detection can be adapted to leverage some of the processing performed as part of a velocity-measurement, temporal correlation SONAR technique, as those who are skilled will also appreciate. Moreover, it will be clear to those skilled in the art, after reading this specification, how make and use alternative embodiments of the present invention, in which the fault detection is performed independently of, or in the absence of, any correlation SONAR processing. For example, the fault detection can be applied to active beamforming SONAR.

Referring to FIG. 5, at task 502 pairs of adjacent hydrophones in array 104 are defined, for all adjacent pairs that comprise the hydrophones that are to be tested. In the box array depicted in FIG. 1, there are h overlapping pairs of adjacent hydrophones, wherein h is the number of hydrophones in the array. Hydrophone 1 and hydrophone 2 are an example of "adjacent" hydrophones. Because the hydrophone pairs are "overlapping," each hydrophone in a box array appears in two different pairs. Another pair of adjacent hydrophones consists of hydrophones 4 and 5. In a line array, there are h-1 overlapping pairs of adjacent hydrophones. Because the hydrophone pairs are "overlapping," each hydrophone in a line array appears in two different pairs, except the hydrophone at each end of the array. As those who are skilled in the art will appreciate, the illustrative embodiment technique can be applied to other geometries of hydrophone arrays as well.

Pairs of hydrophones (i.e., groups that consist of two hydrophones each) are defined at task 502 and used in accordance with the illustrative embodiment. However, it will be clear to those skilled in the art, after reading this specification, how to make and use alternative embodiments of the present invention, in which groups that comprise more than two hydrophones are defined and used for the purpose of performing fault detection.

The hydrophones that are to be tested can either consist of all of the hydrophones in hydrophone array 104 or a subset of those hydrophones. For example, if a subset of hydrophones is selected from array 104, the subset can be based on the relative level of importance of each hydrophone or whether each hydrophone is a "prime" or a "back-up" hydrophone, as discussed earlier and with respect to FIG. 1. Alternatively, the subset of hydrophones might be based on another set of criteria. Additionally, the particular subset of hydrophones that is selected can vary from one iteration of processing in task 302 to another. For example, hydrophones of high importance might be included in every processing iteration, while hydrophones of lower importance might be processed in some of the processing iterations, but not all. In selecting a subset of hydrophones, as opposed to processing all of the hydrophones, the processing load can be reduced.

In some embodiments, hydrophone pairs are defined, such that some or all of the hydrophones are represented in more than one pair; this results in overlapping pairs which can be used to pinpoint a failed hydrophone, as described later.

The defining of the hydrophone pairs that is performed at task 502 can occur at each iteration of task 302, can occur based on more or more hydrophones having been previously detected as having failed, or can occur periodically or sporadically, as those who are skilled in the art will appreciate.

Continuing with description of the depicted tasks, at task 504 a series of pulses are transmitted vertically towards the ocean bottom. For example, the processing described as part of task 202 can be used to perform task 504. As those who are skilled in the art will appreciate, targets other than the ocean floor that are illuminated by the transmitted pulses would suffice for the purpose of generating usable echo signal information.

At task 506, echoes are detected at each hydrophone in array 104, at least for the hydrophones that are represented in the hydrophone pairs defined at task 502. For example, the processing described as part of task 204 can be used to perform task 506.

At task 508, pulse echo data is amplified, converted from analog to digital, and then digitally filtered to yield in-phase ("I") and quadrature ("Q") data for each hydrophone channel involved in the testing. For example, the processing described as part of task 206 can be used to perform task 508.

In accordance with task 510, a pulse location algorithm is employed to define the leading edge of each pulse from task 508. For example, the processing described as part of task 208 can be used to perform task 510.

At task 512, for each defined hydrophone pair, the I and Q data from a jth echo pulse received by the first hydrophone channel in the pair is correlated with I and Q data from a kth echo pulse for the second hydrophone channel in the pair, thereby forming a correlation product for the hydrophone pair in well-known fashion.

For example, the correlation product, C, for each of hydrophone pairs (1,2) and (4,5) in FIG. 1 is:

$$C_{2,1} = \frac{\sum_{i=1}^{n}(I_{i,2,k}^2 + Q_{i,2,k}^2)^{\frac{1}{2}} \times (I_{i,1,j}^2 + Q_{i,1,j}^2)^{\frac{1}{2}}}{n}$$

$$C_{5,4} = \frac{\sum_{i=1}^{n}(I_{i,5,k}^2 + Q_{i,5,k}^2)^{\frac{1}{2}} \times (I_{i,4,j}^2 + Q_{i,4,j}^2)^{\frac{1}{2}}}{n}$$

wherein n is the number of samples used in the correlation for the jth and kth pulses.

In accordance with the illustrative embodiment, pulse indices j and k are equal—that is, the same pulse is correlated on the different hydrophones in a hydrophone pair. In some alternative embodiments, j and k have different values, so that different pulses are correlated on the hydrophones in a given pair. And in some other alternative embodiments, different pulses can be used across different hydrophone pairs.

At task 514, the correlation product for each defined hydrophone pair is compared with one or more correlation products of other hydrophone pairs, in order to find a statistical inconsistency among the pairs. As those who are skilled in the art will appreciate, a variety of approaches can be used for the statistical evaluation. In accordance with the approach used in the illustrative embodiment, for example, a weighted mean of the channel-to-adjacent-channel correlation products is first calculated. The weighted mean can be calculated by excluding the lowest and highest values or by adjusting the raw mean in some other statistically optimal way. Second, each pair's correlation product value is compared to the weighted mean (i.e., the reference value), for all pairs being tested. If any value is significantly below that mean, the hydrophones in the hydrophone pair that is associated with that value are identified as "failure candidates."

As those who are skilled in the art will appreciate, the one or more correlation products that are used as the basis for comparison can include all hydrophone pairs in the array or a subset of the hydrophone pairs. For example, the subset might consist of only those pairs that are presently being used by the ongoing SONAR solution processing or those pairs that have been earmarked for testing.

At task 516, a failed hydrophone channel is identified. In accordance with the illustrative embodiment approach, the presence of multiple hydrophone pairs that both i) exhibit low correlation-product values (i.e., comprise failure candidates as determined at task 514) and ii) comprise a common hydrophone, suggests that the hydrophone channel in common between the overlapping pairs has failed. The common hydrophone channel is then declared as having "failed."

Those who are skilled in the art, in view of the present disclosure, will know how to use other statistical methods to identify failure candidates at task 514 and failed hydrophone channels at task 516.

After task 516, task execution proceeds to task 304.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for fault detection in a hydrophone array, the method comprising:
    defining groups of two or more hydrophones in the hydrophone array, resulting in a plurality of defined groups;
    generating, for each group in the plurality, a correlation product that is based on signals received by the hydrophones in the group;
    searching for an inconsistency in the correlation product of a first group in the plurality, relative to a reference value; and
    identifying a failed hydrophone channel by searching for an inconsistency in the correlation product of a second defined group in the plurality, the second defined group comprising one of the hydrophones in the first defined group.

2. The method of claim 1 wherein the hydrophones in each of the first group and second group are adjacent.

3. The method of claim 1 wherein the reference value is based on one or more correlation products of other defined groups in the plurality.

4. The method of claim 1 further comprising excluding the failed hydrophone channel from SONAR solution processing.

5. The method of claim 1 wherein the correlation product of the first group in the plurality is also used in at least one velocity-measurement calculation.

6. The method of claim 1 wherein the defining of groups of hydrophones is based on the relative importance of the hydrophones in the hydrophone array.

7. The method of claim 1 wherein the generation further comprises using in-phase ("I") and quadrature ("Q") data for each hydrophone in each defined group.

8. A method for fault detection in a hydrophone array, the method comprising:
    defining pairs of adjacent hydrophones in the hydrophone array, resulting in a plurality of defined pairs;
    generating, for each pair in the plurality, a correlation product that is based on echo signal information received by the hydrophones in the pair;
    searching for an inconsistency in the correlation product of a first pair in the plurality, relative to a reference value that is based on one or more correlation products of other defined pairs in the plurality; and
    identifying a failed hydrophone channel by searching for an inconsistency in the correlation product of a second defined pair in the plurality, the second defined pair comprising one of the hydrophones in the first defined pair.

9. The method of claim 8 wherein the generation of a correlation product for each pair in the plurality further comprises:
    amplifying the echo signal information;
    digitizing the amplified echo signal information; and
    digitally filtering the digitized information.

10. The method of claim 9 wherein the generation further comprises using the digitally-filtered information in the form of in-phase ("I") and quadrature ("Q") data.

11. The method of claim 8 further comprising excluding the failed hydrophone channel from SONAR solution processing.

12. The method of claim 8 wherein the defining of pairs of hydrophones is based on the relative importance of the hydrophones in the hydrophone array.

13. The method of claim 8 wherein the correlation product of the first pair in the plurality is also used in at least one velocity-measurement calculation.

14. An apparatus comprising:
    a hydrophone array that comprises a plurality of hydrophones;
    means for generating, for each group in a plurality of defined groups of hydrophones in the hydrophone array, a correlation product that is based on signals received by the hydrophones in the group;
    means for searching for an inconsistency in the correlation product of a first group in the plurality, relative to a reference value; and
    means for identifying a failed hydrophone channel by searching for an inconsistency in the correlation product of a second defined group in the plurality, the second defined group comprising one of the hydrophones in the first defined group.

15. The apparatus of claim 14 further comprising a transmitter that transmits a series of pulses.

16. The apparatus of claim 15 wherein the hydrophone array is a planar array of sixteen hydrophones for receiving echoes that are based on the transmitted series of pulses.

17. The apparatus of claim 16 wherein at least one hydrophone in the planar array is represented in at least two defined groups.

18. The apparatus of claim 17 wherein the hydrophones in each of the first group and second group are adjacent.

19. The apparatus of claim 14 wherein two or more hydrophones in the hydrophone array are assigned a relative importance with respect to one another, and wherein the defined groups of hydrophones are based on the relative importance assigned.

20. The apparatus of claim 14 further comprising means for excluding the failed hydrophone channel from SONAR solution processing.

* * * * *

UNITED STATES PATENT AND TRADEMARK OFFICE
CERTIFICATE OF CORRECTION

PATENT NO. : 7,738,316 B2  
APPLICATION NO. : 11/945144  
DATED : June 15, 2010  
INVENTOR(S) : Scoca et al.

Page 1 of 1

It is certified that error appears in the above-identified patent and that said Letters Patent is hereby corrected as shown below:

Col. 1, Line 6  
Insert following the title:

-- GOVERNMENT INTEREST

This invention was made with Government support under Government Contract Nos. N00030-08-C-0002 and N-00030-10-C-0002 awarded by the Department of the Navy. The Government has certain rights in the invention. --

Signed and Sealed this  
Third Day of May, 2011

David J. Kappos  
*Director of the United States Patent and Trademark Office*